United States Patent
Fleming, Jr. et al.

(10) Patent No.: US 6,446,468 B1
(45) Date of Patent: Sep. 10, 2002

(54) PROCESS FOR FABRICATING OPTICAL FIBER INVOLVING OVERCLADDING DURING SINTERING

(75) Inventors: James William Fleming, Jr., Westfield, NJ (US); Sandeep Kakar, Decatur, GA (US); Richard M. Lum, Colts Neck; Eric M. Monberg, Princeton, both of NJ (US)

(73) Assignee: Fitel USA Corp.

( * ) Notice: Subject to any disclaimer, the term of this patent is extended or adjusted under 35 U.S.C. 154(b) by 249 days.

(21) Appl. No.: 09/630,066

(22) Filed: Aug. 1, 2000

(51) Int. Cl.$^7$ ............................................ C03B 37/027
(52) U.S. Cl. ......................................... 65/412; 65/42 C
(58) Field of Search ................................... 65/412, 427

(56) References Cited

U.S. PATENT DOCUMENTS

| | | | |
|---|---|---|---|
| 4,217,027 A | | 8/1980 | MacChesney et al. |
| 4,262,035 A | | 4/1981 | Jaeger et al. |
| 4,308,044 A | * | 12/1981 | Myer ........................... 29/453 |
| 4,775,401 A | | 10/1988 | Fleming et al. |
| 4,909,816 A | | 3/1990 | MacChesney et al. |
| 5,076,824 A | * | 12/1991 | Miller ......................... 65/412 |
| 5,090,980 A | * | 2/1992 | Clasen .......................... 134/2 |
| 5,240,488 A | | 8/1993 | Chandross et al. |
| 5,307,436 A | | 4/1994 | Berkey |
| 5,352,259 A | * | 10/1994 | Oku et al. ..................... 65/144 |
| 5,658,363 A | * | 8/1997 | Ince et al. ..................... 65/412 |
| 5,735,927 A | | 4/1998 | Sanghera et al. |
| 5,900,036 A | | 5/1999 | Mossadegh et al. |
| 5,917,109 A | * | 6/1999 | Berkey ......................... 65/412 |

FOREIGN PATENT DOCUMENTS

| | | | | |
|---|---|---|---|---|
| EP | 176263 | | 4/1986 | |
| EP | 392599 | | 10/1990 | |
| EP | 501429 | * | 9/1992 | .................. 65/412 |
| GB | 2176472 | | 12/1986 | |
| GB | 2284206 | | 5/1995 | |
| JP | 59-15090 | * | 4/1984 | .................. 65/412 |
| WO | WO 140126 | | 6/2001 | |

OTHER PUBLICATIONS

U.S. Patent Application Ser. No. 09/459775, filed Dec. 13, 1999.

* cited by examiner

*Primary Examiner*—John Hoffmann
(74) *Attorney, Agent, or Firm*—Scott Rittman

(57) ABSTRACT

An improved technique for assembling and drawing fiber from preforms is provided. In one embodiment, the technique involves providing a core rod assembly comprising a core rod and a bushing attached at an end of the assembly. The core rod assembly is inserted into an unsintered overcladding tube, and secured to the tube such that the core rod assembly is suspended within. The overcladding tube and the core rod assembly are heated to sinter the overcladding tube and thereby form a preform assembly. During the heating step, the bushing comes into contact with the interior of the overcladding tube, and, because the bushing has a larger diameter than the core rod, an annular gap is maintained between the core rod assembly and the interior of the overcladding tube. It is then possible to attach a draw handle to the preform assembly, place the preform assembly into a draw tower, and draw fiber from the preform assembly by an overclad during draw technique.

22 Claims, 5 Drawing Sheets

PROCESS FOR FABRICATING OPTICAL FIBER INVOLVING OVERCLADDING DURING SINTERING

BACKGROUND OF THE INVENTION

1. Field of the Invention

The invention relates to fabrication of optical fiber, in particular preparation of the preform from which fiber is drawn.

2. Discussion of the Related Art

Optical fiber is produced from a glass preform. The preform is generally arranged vertically in a draw tower such that a portion of the preform is lowered into a furnace region. The portion of the preform placed into the furnace region begins to soften, and the lower end of the preform forms what is known as the neck-down region, where glass flows from the original cross-sectional area of the preform to the desired cross-sectional area of the fiber. From the lower tip of this neck-down region, the optical fiber is drawn.

Optical transmission fiber typically contains a high-purity silica glass core optionally doped with a refractive index-raising element such as germanium, an inner cladding of high-purity silica glass optionally doped with a refractive index-lowering element such as fluorine, and an outer cladding of undoped silica glass. In some manufacturing processes, the preforms for making such fiber are fabricated by forming an overcladding tube for the outer cladding, and separately forming a rod containing the core material and inner cladding material. The core/inner cladding are fabricated by any of a variety of vapor deposition methods known to those skilled in the art, including vapor axial deposition (VAD), outside vapor deposition (OVD), and modified chemical vapor deposition (MCVD). MCVD is discussed in U.S. Pat. Nos. 4,217,027; 4,262,035; and 4,909,816. MCVD involves passing a high-purity gas, e.g., a mixture of gases containing silicon and germanium, through the interior of a silica tube (known as the substrate tube) while heating the outside of the tube with a traversing oxy-hydrogen torch. In the heated area of the tube, a gas phase reaction occurs that deposits particles on the tube wall. This deposit, which forms ahead of the torch, is sintered as the torch passes over it. The process is repeated in successive passes until the requisite quantity of silica and/or germanium-doped silica is deposited. Once deposition is complete, the body is heated to collapse the substrate tube and obtain a consolidated core rod in which the substrate tube constitutes the outer portion of the inner cladding material. To obtain a finished preform, the overcladding tube is typically placed over the core rod, and the components are heated and collapsed into a solid, consolidated preform. It is possible to sinter a porous overcladding tube while collapsing it onto a core rod, as described in U.S. Pat. No. 4,775,401.

Because the outer cladding of a fiber is distant from transmitted light, the overcladding glass does not have to meet the optical performance specifications to which the core and the inner cladding must conform. For this reason, efforts to both ease and speed manufacture of fiber preforms focused on methods of making overcladding tubes. One area of such efforts is the use of a sol-gel casting process.

U.S. Pat. No. 5,240,488 (the '488 patent), the disclosure of which is hereby incorporated by reference, discloses a sol-gel casting process capable of producing crack-free overcladding preform tubes of a kilogram or larger. In the process of the '488 patent, a colloidal silicon dispersion, e.g., fumed silica, is obtained. To maintain adequate stability of the dispersion and prevent agglomeration, the pH is raised to a value of about 11 to about 14 by use of a base, and the dispersion is then aged. Subsequent to aging, as discussed in Col. 15, lines 39–65 of the '488 patent, a gelling agent such as methyl formate is added to the dispersion to lower the pH. Typically, once the gelling agent is added, but before gellation occurs, the mixture is pumped into a tubular mold containing a central mandrel, and the gel is aged in the mold for 1 to 24 hours. The mandrel is removed, and the gelled body is then extracted from the mold. The body is then dried, fired to remove volatile organic materials and water,. and then sintered to form the finished overcladding tube. The tube can then be used to form conventional preforms.

There are several difficulties typically encountered in forming preforms. These include insertion of the rod into the overcladding tube the small clearances demand that the rod and tube be extremely straight, which is difficult in practice. The amount of heat required to collapse a thick-walled overcladding onto a tube is considerable, and often requires a specialized furnace or plasma torch. In addition, some overcladding tubes are treated with an additional plasma etch to smooth their interior prior to placing the core rod therein, and such additional process steps are advantageously avoided. Also, collapsing a tube onto a rod tends to create inhomogeneous sites or nucleation centers for bubbles, and these bubbles can result in undesired airlines in the drawn fiber.

Thus, improved techniques for assembling preforms and drawing fiber from preforms, particularly with sol-gel overcladding tubes, are desired.

SUMMARY OF THE INVENTION

The invention provides an improved technique for assembling and drawing fiber from preforms. In one embodiment, the technique involves providing a core rod assembly that comprises a core rod, optionally with an overcladding layer formed thereon. (Overcladding layer indicates that the overcladding material is located directly on the surface of the rod.) The core rod assembly comprises a handle at a first end and a centering bushing attached at a second end of the assembly. The core rod assembly is inserted into an unsintered overcladding tube such that there is an annular gap between the assembly exterior and the tube interior. The first end of the assembly is typically secured to the tube, by use of the handle, such that the core rod assembly is suspended within the tube, and the core rod assembly and tube are typically suspended by the handle for further processing. The overcladding tube and the core rod assembly are then heated to sinter the overcladding tube and thereby form a preform assembly.

During the heating step, the centering bushing comes into contact with the interior of the overcladding tube, and, because the bushing has a larger diameter than the core rod (or core rod plus overcladding layer), most of the annular gap between the core rod assembly and the overcladding tube is maintained. It is then possible to attach a draw handle to the preform assembly, place the preform assembly into a draw tower, and draw fiber from the preform assembly. Specifically, in the draw furnace, the annular gap is evacuated through the draw handle, and the end of the preform opposite the draw handle is lowered into the draw furnace. The combination of the high temperatures, e.g., 2000 to 2200° C. and the reduced pressure in the annular gap induce the tube to collapse onto the core rod as the whole assembly is fed into the furnace. It is possible to perform the process such that the preform assembly contains two or more coaxial overcladding tubes around the core rod, e.g., where the core rod assembly comprises one or more sintered or unsintered overcladding tubes.

Drawing fiber from a preform assembly containing a core rod secured within an overcladding tube, with an annular gap between the rod and tube, has been previously used, but only by insertion of a core rod into a sintered tube. See, e.g., co-assigned patent application Ser. No. 09/515,227, entitled "Apparatus and Method for Making Multiple Overclad Optical Fiber Preforms and Optical Fiber Therefrom," filed Feb. 28, 2000. The invention, however, provides numerous advantages where overcladding tubes are produced by sol-gel techniques, or other techniques that result in production of an unsintered tube. For example, the typical process sequence for a gel tube is sinter, plasma etch the tube bore, insert a core rod, collapse the tube onto the rod, and draw fiber from the monolithic preform. According to the invention, the plasma etch is no longer necessary since the tube is not collapsed onto the rod, and separate sintering and collapse steps are avoided. Moreover, because an unsintered tube has a larger inner diameter than the final, sintered tube, the clearance for inserting a rod into the tube is greater, and this clearance eases the insertion, reduces the number of damaged tubes and rods, and relaxes the specifications for bow of the tubes and rods.

DETAILED DESCRIPTION OF THE INVENTION

Figure 1A:
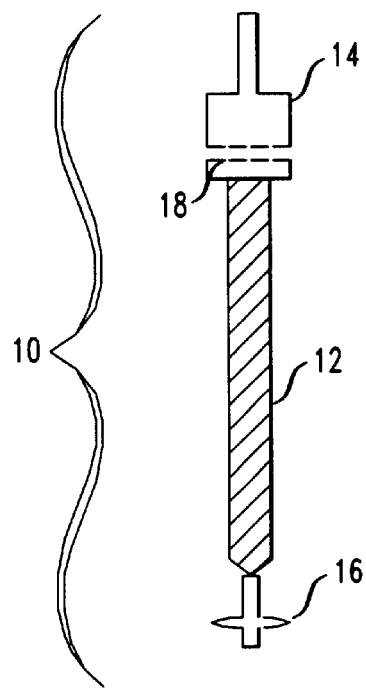
FIGS. 1A to 1E illustrate an embodiment of the invention.

An embodiment of the invention is illustrated in FIGS. 1A to 1E. As shown in FIG. 1A, core rod assembly 10 is provided, the assembly containing a core rod 12. The core rod 12 is generally silica-based and is fabricated by any suitable method, including vapor axial deposition (VAD), outside vapor deposition (OVD), and modified chemical vapor deposition (MCVD). A handle 14 is attached at one end of the core rod 12, e.g., by fusing the handle onto the rod 12. (Handle indicates any mechanism by which the core rod assembly is manipulated and/or supported. It is possible, for example, for the handle to be integral with the core rod or separately attached to the core rod.) The handle 14 of this embodiment contains a hole 18, which allows the handle to be secured in an overcladding tube, as discussed below. A end piece 16 is attached to a second end of the core rod 12, e.g., by fusing the bushing onto the rod 12. The end piece 16 (bushing) typically consists of a 1 to 2 mm thick silica disk having a diameter about 110% of the inner diameter of the sintered overcladding tube, although other configurations are possible. Typically, the disk has holes, e.g., 3 mm diameter holes, to allow evacuation of the annular gap during draw, as noted above. The function of the bushing 12 is discussed in more detail below.

Figure 1B:
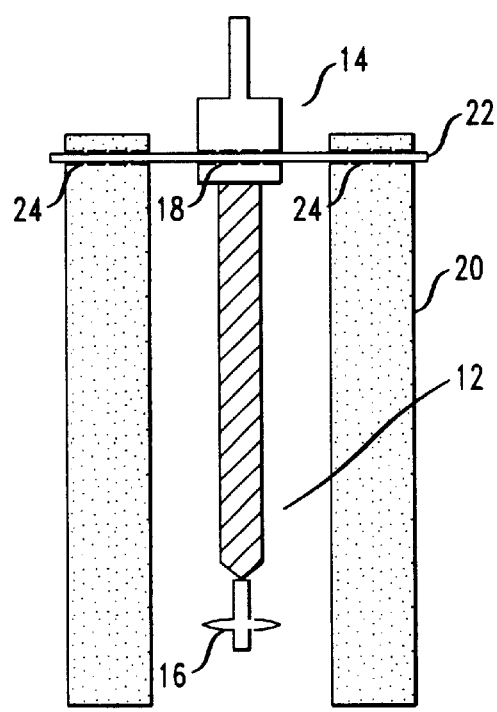
Figure 1C:
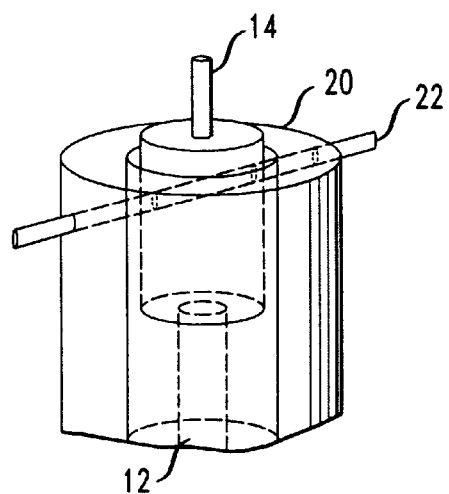
Figure 1D:
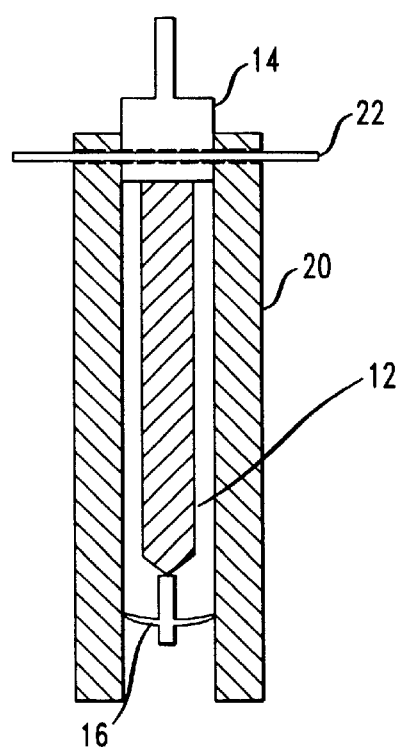

As shown in FIG. 1B, the core rod assembly 10 is inserted into an unsintered overcladding tube 20 such that an annular gap exists between the exterior of the assembly 10 and the interior of the tube 20. The tube 20 has a hole 24 through its diameter that corresponds to the hole 18 in the core rod assembly handle 14. (The handle diameter is typically about 10% less than the inner diameter of the unsintered overcladding tube.) A pin 22 is inserted through both sets of holes 24, 18 to secure the core rod assembly. A more detailed view of this technique for securing the core rod assembly is shown in FIG. 1C. Other techniques for securing a core rod or core rod assembly are also possible. Advantageously, the tube and core rod assembly are arranged such that they hang substantially plumb. This arrangement reduces effects of fusing of one side of the core rod assembly to the wall of the overcladding tube. The overcladding tube 20 and core rod assembly 10 are suspended by the handle 14, and heated to sinter the overcladding tube 20. During this heating, the tube 20 advantageously shrinks onto the handle 14 thereby forming a seal at that end of the resulting preform assembly.

The bushing 16 generally keeps the core rod 12 from contacting the interior of the tube 20 during the heating, and, at a minimum, substantially reduces the extent. of such contact. Thus, it is possible for some, generally minor, contact to occur between the core rod 12 and the overcladding tube 20 during sintering, but a small amount of such contact does not tend to detrimentally affect the process or the resultant fiber. For example, typically at least 90% of the surface area of the core rod assembly remains free of contact with the tube. Also, the end piece 16 is typically configured to deform during the shrinkage of the tube 20, to reduce bending stresses on the rod 12. These effects are reflected in the post-sintered preform assembly illustrated in FIG. 1D.

Figure 1E:
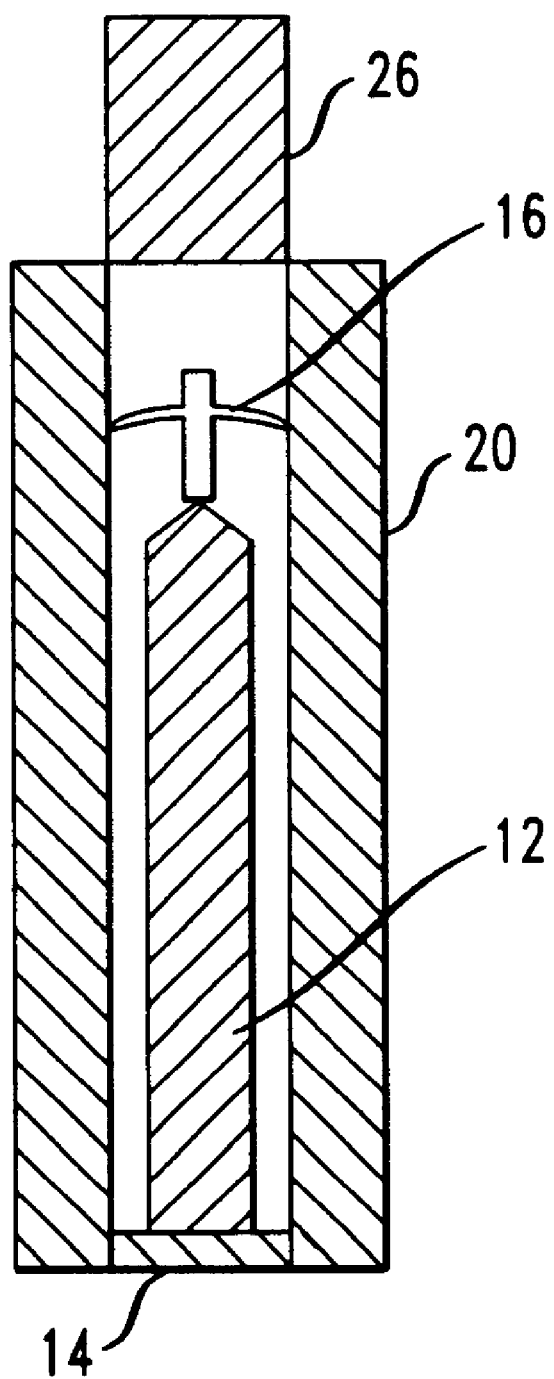

Subsequent to the heating step, the portion of the handle 14 and tube 20 through which the pin 22 was inserted are generally cut off. As illustrated in FIG. 1E, a draw handle 26 is attached to the preform assembly at the end opposite the core rod handle 14. The draw handle 26 is generally hollow to allow a vacuum to be drawn when the preform assembly is placed into the draw furnace. The end piece 16 generally contains perforations for this same reason. The preform assembly is then capable of being secured in a draw tower using the draw handle 26. In the draw tower, the annular gap is evacuated, and the end of the preform opposite the draw handle is lowered into the draw furnace. The combination of the high temperatures, e.g., 2000 to 2200° C. and the reduced pressure in the annular gap induce the tube to collapse onto the core rod as the whole assembly is fed into the furnace.

In addition to simply inserting a core rod into a single overcladding tube, it is possible to incorporate additional overcladding around the core rod and within the unsintered overcladding tube. For example, such additional overcladding is useful for increasing the diameter of the overall preform, and thus the amount of fiber capable of being drawn. Optionally, this first inner overcladding material is doped, e.g., with fluorine. One way to provide this overcladding is to insert a core rod into a first, sintered overcladding tube and collapse the tube onto the rod by conventional techniques, i.e., by forming an overcladding layer directly on the core rod. Then, the overclad rod is placed into a second, unsintered overcladding tube, and the above steps are followed.

Figure 2A:
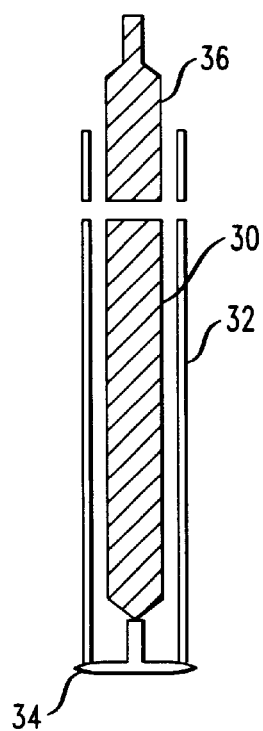
FIGS. 2A to 2C illustrate another embodiment of the invention.

Advantageously, however, instead of forming a first overcladding layer directly on the core rod, the core rod assembly comprises a first sintered overcladding tube placed over the core rod, with an annular gap between all or a portion of the core rod and first overcladding tube, in order to attain the benefits discussed above. One embodiment of this technique is illustrated in the cross-sectional schematics of FIGS. 2A to 2C. FIG. 2A shows a core rod 30 having a handle 36 and a end piece 34, the end piece 34 configured as discussed above. To complete the core rod assembly, a first, sintered overcladding tube 32 is placed onto the rod 30, the tube 32 being supported by the end piece 34. In this embodiment, holes are provided through the diameters of the rod 30 and the tube 32 at a first end of the rod 30 and tube 32, such that the holes will be aligned subsequent to placement of the first overcladding tube 32 onto the end piece 34. (As used herein, core rod assembly includes a configuration such as shown in FIG. 2A, i.e., a core rod surrounded by one or more sintered or unsintered tubes, where the assembly is later placed within an unsintered overcladding tube.)

Figure 2B:
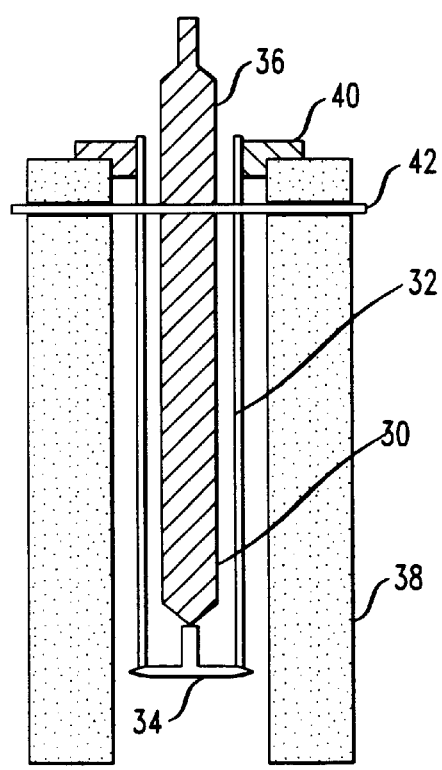

As shown in FIG. 2B, the core rod assembly comprising the core rod 30 and the first overcladding tube 32 are inserted into a second, unsintered overcladding tube 38. The second overcladding tube 38 has a hole through its diameter corresponding to the holes in the core rod 30 and first overcladding tube 32, and a pin 42 is placed through the holes to secure the first tube 32 and core rod 30 within the second overcladding tube 38. A silica spacer ring 40 is generally placed on the upper edge of the second overcladding tube 38 prior to insertion of the core rod assembly. The spacer ring 40 assists in centering the core rod assembly, and also promotes a seal upon sintering, as discussed below. (In the embodiment of FIGS. 1A to 1E, this seal was provided by the handle alone. Because such a handle configuration is difficult in a multiple-tube embodiment, a mechanism such as the spacer ring is advantageously used.) The end piece 34 also assists in maintaining the desired coaxial relationship of the core rod 30 and first overcladding tube 32 within the second overcladding tube 38, in the manner discussed above. The entire assembly is suspended by the handle 36.

Figure 2C:
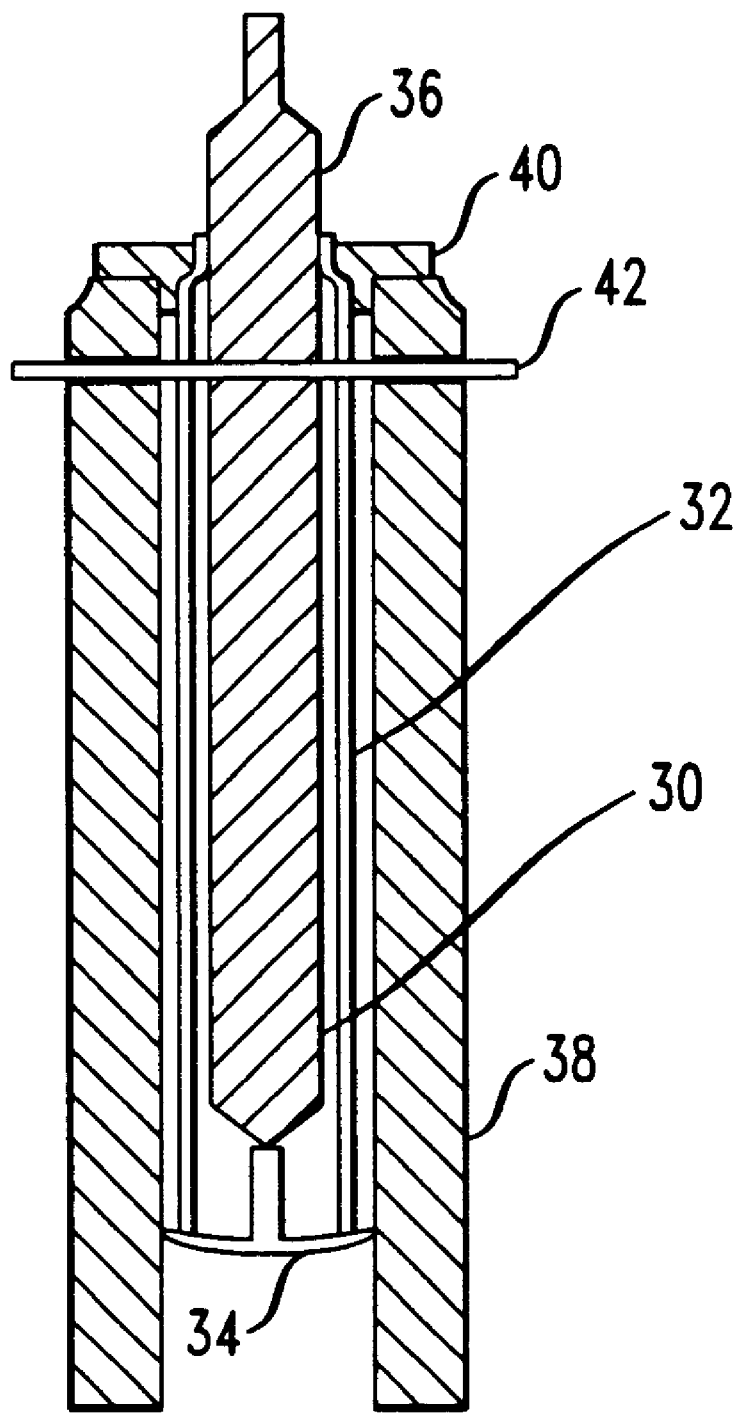

The entire assembly is then placed into a sintering furnace. As shown in FIG. 2C, the top of the assembly is sealed in the sintering furnace, i.e., the second overcladding tube 38, spacer ring 40, and first overcladding tube 32 are treated to induce their combined collapse onto the core rod 30 to form a seal. The remainder of the assembly is heated to sinter the second overcladding tube 38, while maintaining the annular gaps between the second tube 38 and first tube 32 and between the first tube 32 and the core rod 30. As with the embodiment above, when the seal is formed, typically at least 90% of the surface area of the core rod 30 remains free of contact with the first overcladding tube 32, with a comparable percentage of the outer surface of the first tube 32 remaining free of contact with the second overcladding tube 38. The sintered assembly is then generally provided with a hollow draw handle and placed into a draw tower, where fiber is drawn as discussed above. The bushing 34 generally has some perforations that allow a vacuum to be drawn in the annular gaps between the rod 30 and the first tube 32 and between the first tube 32 and the second tube 38 in preparation for drawing fiber, as noted above.

It is possible to use variations of this technique, as well as other techniques, to prepare preforms from two overcladding tubes. For example it is possible to place a first overcladding tube over a core rod, and then fuse the top, e.g., the top 2 to 4 cm, of the core rod and tube together, thereby providing a core rod assembly. Fabrication of the preform would then be performed as described above.

It is possible to provide a core rod assembly with two or more such sintered overcladding tubes. It is also possible to use a core rod assembly comprising an unsintered overcladding tube. Such an embodiment involves placing a first unsintered overcladding tube around a core rod and inserting that resultant core rod assembly within a second unsintered overcladding tube. The entire assembly is then sintered such that annular gaps are maintained between the second and first tubes and between the first tube and the core rod.

Various combinations of sintered and unsintered tubes are possible, in accordance with the guidelines presented herein.

The unsintered overcladding tubes are generally formed from a sol-gel process such as disclosed in U.S. Pat. No. 5,240,488, although other processes are also possible. Sintered tubes for multiple-tube embodiments are capable of being formed by sol-gel or other suitable techniques. Briefly, the sol-gel process of the '488 patent involves providing a silica dispersion, inducing gelation of the dispersion and casting the gel in a tube form, and drying and heat treating the gel body. Sintering is then performed as discussed above. During such sintering, the shrinkage of the inner diameter of the tube will vary based on the amount of silica in the silica dispersion. For example, for a sol containing 42 to 52 wt. % silica, shrinkage of the inner diameter generally ranges from 22 to 26%.

For such a sol-gel tube (which has already been through drying and heat treatment steps prior to insertion of the core rod assembly) the whole assembly is optionally fired at a temperature suitable to remove any impurities remaining after earlier treatment, e.g., at temperature around 1000 to 1300° C. (Such firing is also able to be performed prior to insertion of the core rod assembly.) Generally this is performed by translating or traversing the assembly through the hot zone of a furnace. Vent holes provided in the handle are advantageous in that they allow gaseous impurities, including water, to flow out from the interior of the tube. For sintering, the furnace is generally heated to a sintering temperature, e.g., around 1500° C., and the tube is typically pulled up through the hot zone by the core rod assembly handle (referred to as an ascending sinter). The high temperature softens the silica and thereby induces some flexibility to the tube and the handle tip. Thus, at the area where the handle is inserted within the tube, the tube deforms around the handle, forming a continuous seal. Forming this seal at the beginning of the sintering step is an advantage of the ascending sinter. Alternatively, however, it is possible to instead lower the tube through the hot zone of a furnace. It is also contemplated to use a sintering technique in which the tube is passed through the furnace zone several times to sinter the body, as discussed, for example, in co-assigned provisional patent application entitled "Silica-Based Optical Fibers And Multi-Pass Sintering" (our reference Lum 5-10-7-7) filed concurrently herewith, the disclosure of which is hereby incorporated by reference.

For an embodiment using a single silica-based overcladding tube, the annular gap, i.e., the gap between the exterior of the core rod and the interior, of the overcladding tube as measured in the direction normal to the longitudinal axes of the rod and tube, is about 0.2 mm to about 0.8 mm in the sintered preform assembly. The pre-sintered annular gap will vary depending on the characteristics of the unsintered tube. Controlled experiments are easily performed to determine an appropriate presintering gap to attain a desired post-sintering gap for a particular tube size and type. By way of example, the pre-sintered gap for a typical sol-gel silica tube having an inner diameter of 35 mm and a tube wall thickness of 26 mm is generally about 5 mm to about 6 mm.

For an embodiment using a first sintered silica-based overcladding tube and a second unsintered silica-based overcladding tube, the post-sintering annular gap between the core rod and the first tube is about 0.3 mm to about 0.6 mm, and. the post-sintering annular gap between the first and second tubes is about 0.3 mm to about 0.8 mm. Again, the pre-sintered annular gap will vary depending on the size of the unsintered tube.

According to the invention it is possible to prepare preform assemblies capable of producing at least 600 km of 125 μm diameter optical fiber, optionally at least 2400 km of 125 μm diameter optical fiber.

Other embodiments of the invention will be apparent to those skilled in the art from consideration of the specification and practice of the invention disclosed herein.

What is claimed is:

1. A process for fabricating an article, comprising the steps of:
    providing a core rod assembly comprising a core rod, optionally with an overcladding layer formed on the core rod, wherein the core rod assembly has a first end and a second end, and wherein the core rod assembly comprises a end piece proximate to the second end of the core rod assembly;
    providing an unsintered overcladding tube;
    inserting the core rod assembly into the unsintered overcladding tube such that an annular gap is provided between at least a portion of the exterior of the core rod assembly and at least a portion of the interior of the unsintered overcladding tube; and
    heating the overcladding tube and the core rod assembly to sinter the overcladding tube and form a preform assembly, wherein at the completion of the heating step at least a portion of the core rod assembly remains free of contact with the overcladding tube.

2. The process of claim 1, wherein at least 90% of the surface of the core rod assembly remains free of contact with the overcladding tube after the heating step.

3. The process of claim 1, wherein the diameter of the bushing is greater than the diameter of the core rod or the core rod with the overcladding layer formed thereon, and wherein during the heating step at least a portion the end piece comes into contact with the interior of the overcladding tube.

4. The process of claim 1, wherein the overcladding tube is derived from gelation of a silica particle dispersion.

5. The process of claim 1, further comprising the steps of:
    removing at least a portion of a first end of the preform assembly; and
    attaching a draw handle to the end of the preform assembly opposite the first end.

6. The process of claim 5, wherein the draw handle is hollow.

7. The process of claim 1, wherein during the heating step the overcladding tube shrinks onto a portion of the core rod assembly proximate the first end of the core rod assembly, such that a first end of the preform assembly is sealed.

8. The process of claim 1, wherein the average annular gap between the exterior of the core rod assembly and the interior of the overcladding tube, after the heating step, is about 0.2 mm to about 0.8 mm.

9. The process of claim 1, wherein the core rod assembly is secured to the overcladding tube proximate the first end of the core rod assembly, such that the core rod assembly is suspended within the overcladding tube.

10. The process of claim 9, wherein the core rod assembly is secured such that the core rod is able to hang at least substantially plumb.

11. The process of claim 1, wherein the core rod assembly comprises a handle at the first end of the core rod assembly, wherein the handle is secured to the overcladding tube, and wherein the core rod assembly and the overcladding tube are suspended by the handle.

12. The process of claim 11, wherein the overcladding tube comprises a hole through the entire diameter of the tube, the hole being perpendicular to the tube axis and located proximate to a first end of the tube, wherein the core rod assembly handle comprises a hole, the hole being perpendicular to the long axis of the handle and proximate the first end of the core rod assembly, wherein the hole in the core rod assembly handle corresponds to the hole in the tube, and wherein the core rod assembly is secured in the tube by inserting a pin through the hole in the tube and the hole in the core rod assembly handle.

13. The process of claim 1, wherein the contact between the bushing and the interior of the overcladding tube during the heating step induces deformation of the end piece.

14. The process of claim 1, wherein prior to the heating step the core rod assembly further comprises a sintered overcladding tube, the core rod located within the sintered overcladding tube such that there exists an annular gap between at least a portion of the sintered overcladding tube and at least a portion of the core rod.

15. The process of claim 1, wherein prior to the heating step the core rod assembly further comprises an unsintered overcladding tube, the core rod located within the unsintered overcladding tube such that there exists an annular gap between at least a portion of the unsintered overcladding tube and at least a portion of the core rod, and wherein after the heating step at least a portion of the core rod remains free of contact with the overcladding tube.

16. A process for fabricating an article, comprising the steps of:
    providing a core rod assembly comprising a first sintered or unsintered overcladding tube and a core rod located within the first overcladding tube, wherein there exists an annular gap between at least a portion of the core rod and at least a portion of the first sintered or unsintered overcladding tube, and wherein the core rod assembly comprises a handle proximate to a first end of the core rod assembly and a end piece proximnate to a second end of the core rod assembly;
    providing a second unsintered overcladding tube;
    inserting the core rod assembly into the unsintered overcladding tube such that an annular gap is provided between at least a portion of the exterior of the core rod assembly and at least a portion of the interior of the unsintered overcladding tube; and
    heating the second overcladding tube and the core rod assembly to sinter the second overcladding tube or both the first and the second overcladding tubes and form a preform assembly,
    wherein at the completion of the heating step at least a portion of the core rod assembly remains free of contact with the first overcladding tube and at least a portion of the first overcladding tube remains free of contact with the second overcladding tube.

17. The process of claim 16, further comprising the steps of:
    placing the preform assembly into a draw tower; and
    drawing optical fiber from the preform assembly while evacuating the annular gaps between the core rod assembly and the first overcladding tube and between the first overcladding tube and the second overcladding tube.

18. The process of claim 16, wherein the first overcladding tube is a sintered overcladding tube.

19. The process of claim 16, wherein at the completion of the heating step the average annular gap between the first overcladding tube and the core rod is about 0.3 mm to about 0.6 mm, and the average annular gap between the first overcladding tube and the second overcladding tube is about 0.3 mm to about 0.8 mm.

20. The process of claim 16, wherein during the heating step a first end of the preform assembly proximate the first end of the core rod assembly becomes sealed.

21. The process of claim 20, further comprising the step of placing a spacer ring onto the second unsintered overcladding tube prior to insertion of the core rod assembly.

22. The process of claim 16, wherein the handle is secured to the second overcladding tube such that the core rod assembly is suspended within the second overcladding tube.

* * * * *